Sept. 5, 1961 G. W. COOK 2,999,209
SLOW ATTACK-FAST RELEASE AVERAGING CIRCUIT
Original Filed June 15, 1953
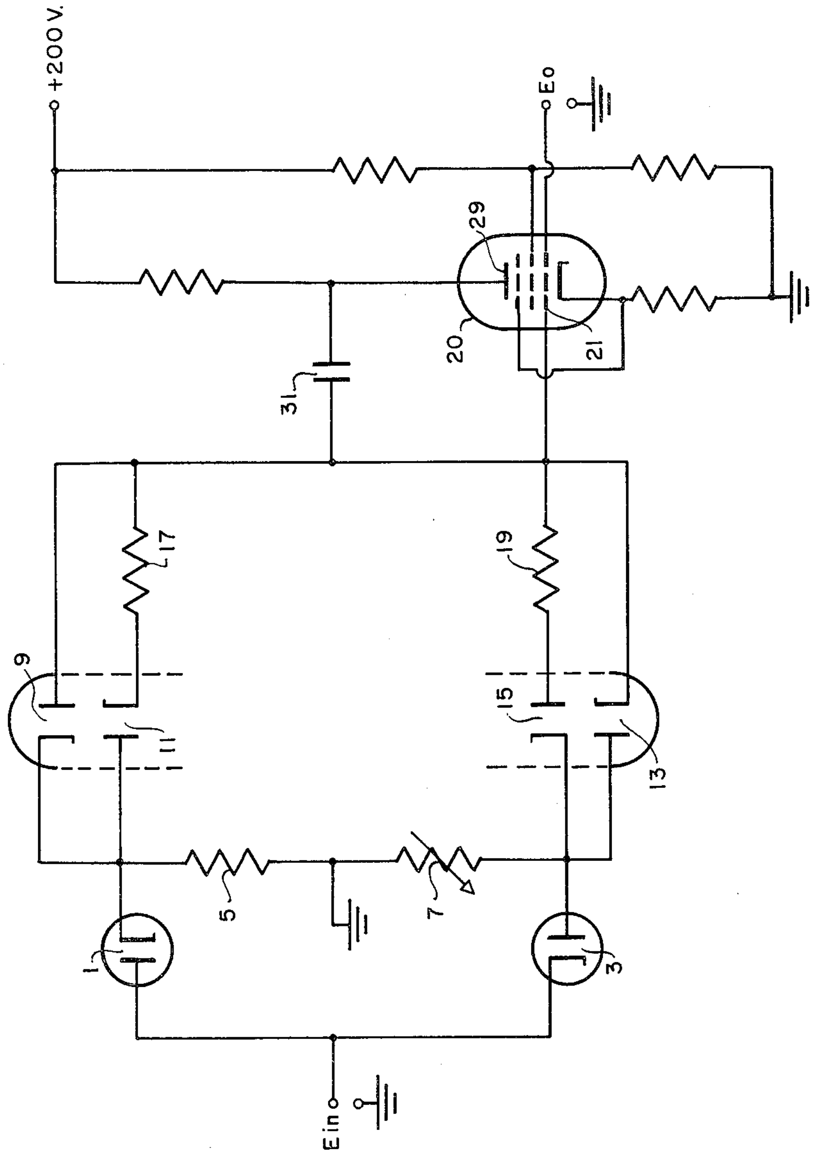
INVENTOR
GEORGE W. COOK
BY
ATTORNEYS United States Patent Office 2,999,209
Patented Sept. 5, 1961

2,999,209
SLOW ATTACK-FAST RELEASE AVERAGING CIRCUIT

George W. Cook, 2211 39th St. NW., Washington, D.C.
Original application June 15, 1953, Ser. No. 361,885, now Patent No. 2,909,759, dated Oct. 20, 1959. Divided and this application June 9, 1959, Ser. No. 819,193
2 Claims. (Cl. 328—127)
(Granted under Title 35, U.S. Code (1952), sec. 266)

The invention described herein may be manufactured and used by or for the Government of the United States of America for governmental purposes without the payment of any royalties thereon or therefor.

This application is a division of application Serial No. 361,885, filed June 15, 1953, now Patent No. 2,909,759, for Sensitive Vertical Displacement Seismometer.

The present invention relates to a slow attack fast release averaging circuit and more particularly to a slow attack fast release averaging circuit which is self correcting in that the memory of the unit is reduced directly with a restoration of the original control voltage.

Most known integrating circuits are designed to have a short attack time and a long release time. In most applications, a high merit factor for integrating circuits demands a long storage or memory capability.

However, if, for example, an integrator of this known type were utilized for providing the control signal for the period and damping adjustments of a seismometer such as that disclosed in the above mentioned copending application Serial No. 361,885, a change in input voltage would cause overcompensation and oscillation of the seismic arm back and forth through zero.

The present invention provides an averaging circuit which is self correcting in that the memory of the unit is reduced directly with a restoration, of the original control voltage, but any deviation away from the original control voltage causes a very slow change in output voltage.

An object of the present invention, therefore, is the provision of a slow attack fast release averaging circuit.

Another object is to provide a slow attack fast release averaging circuit which provides slow response to deviations away from the normal input voltage and rapid response to deviations toward the normal input voltage.

The exact nature of this invention as well as other objects and advantages thereof will be readily apparent from consideration of the following specification relating to the annexed drawing in which the single figure shows a preferred embodiment of the invention.

Referring now to the drawing, an input signal $E_{in}$ is applied to diodes 1 and 3 which provide separate paths for positive and negative deviations of the input signal. A positive signal is passed through diode 1 to ground through resistor 5 to produce a voltage which appears through diodes 11 and 15 and resistors 17 and 19 in series and is impressed on the control grid 21 of pentode tube 20.

Variations in the conduction of pentode 20 are amplified and appear as much larger voltage changes at its anode 29 and this large voltage charges capacitor 31, so that the effective capacitance of capacitor 31 is multiplied by the amplification of the tube.

Thus, it can be seen that the output voltage $E_0$ appearing at the juncture of resistors 17 and 19 is effectively paralleled by a large capacitance and therefore changes very slowly.

However, when the voltage across resistor 5 decreases, the capacitor 31 discharges through the reverse connected diode 9 which provides a low resistance discharge path.

The circuit operates in a similar fashion in the opposite polarity through diode 3 and resistance 7 which is made adjustable to balance the operation of the circuit in the two directions. Similarly diode 13 provides a discharge path for capacitor 31 in the event of a decrease in magnitude of voltage across resistor 7.

Although the device which has been described is particularly adapted for use in a seismometer it will be realized that the circuit may be used in various other types of systems where a control device which has the characteristics of this invention may be needed.

It should be understood, of course, that the foregoing disclosure relates to only a preferred embodiment of the invention and that it is intended to cover all changes and modifications of the example of the invention herein chosen for the purposes of the disclosure, which do not constitute departures from the spirit and scope of the invention.

What is claimed is:

1. A slow attack fast release averaging circuit comprising a pair of parallel connected circuit means each of which include a uni-directional element, one end of each said elements being connected together and the other end of each said elements being connected through an impedance element to ground potential, a first pair of electronic tubes comprising a first and a second diode and a second pair of electronic tubes comprising a first and second diode, each of said diodes having an anode element and a cathode element, said tubes of said first and second pairs being reversely connected such that the cathode element and the anode element of the first and second diodes, respectively, of the first pair being connected together, and the cathode element and anode element of the second and first tubes, respectively, of the second pair being connected together, said connected elements of each pair of tubes being connected to one of said uni-directional elements, a common potential terminal, the anode element of the first diode in the first pair and the cathode element of the first diode in the second pair being connected directly to said common terminal, the cathode element of the second diode in the first pair and the anode element in the second diode of the second pair being connected through individual resistor elements to said common terminal, a signal amplifying means, the input of said signal amplifying means being connected to said common terminal, and a capacitor connected between an output of said amplifying means and said common terminal.

2. In an apparatus as defined in claim 1 but further characterized by said signal amplifying means comprising an electronic tube having a control grid element connected to said common terminal and an anode element connected to said capacitor.

References Cited in the file of this patent

UNITED STATES PATENTS 2,831,107 Raymond et al. ........ Apr. 15, 1958